(12) United States Patent
Spears et al.

(10) Patent No.: US 8,842,185 B1
(45) Date of Patent: Sep. 23, 2014

(54) HDMI IMAGE QUALITY ANALYSIS

(71) Applicant: Microsoft Corporation, Redmond, WA (US)

(72) Inventors: Stacey Spears, Sammamish, WA (US); Matt Dubois, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/804,325

(22) Filed: Mar. 14, 2013

(51) Int. Cl.
*H04N 17/00* (2006.01)
*G06F 19/00* (2011.01)
*H04N 17/02* (2006.01)

(52) U.S. Cl.
CPC ............ *H04N 17/004* (2013.01); *H04N 17/02* (2013.01)
USPC ............................. 348/181; 348/184; 702/122

(58) Field of Classification Search
CPC ..... H04N 17/00; H04N 17/02; H04N 17/004; H04N 17/04; H04N 17/045; G01N 21/274; G01R 13/029; G01R 29/26; G01R 31/31728; G01R 35/005; G01R 23/16; G01R 13/0218; G01R 31/3183; G01R 35/00; H04L 12/2697
USPC ........ 348/192, 181, 180, 184, 185; 333/28 R; 702/110, 107, 117, 90, 91, 108, 81, 84, 702/66, 69, 79, 122
See application file for complete search history.

(56) References Cited

U.S. PATENT DOCUMENTS

| | | | |
|---|---|---|---|
| 7,996,584 B2 | 8/2011 | Keady et al. | |
| 8,014,968 B2 | 9/2011 | Stakely et al. | |
| 8,200,028 B2 | 6/2012 | Gabso et al. | |
| 8,212,826 B1 | 7/2012 | Williams et al. | |
| 8,280,668 B2 | 10/2012 | Horan et al. | |
| 2010/0013579 A1* | 1/2010 | Horan et al. | 333/28 R |
| 2010/0020179 A1* | 1/2010 | Horan et al. | 348/181 |
| 2010/0058409 A1 | 3/2010 | Chapman et al. | |
| 2010/0079597 A1* | 4/2010 | Stokes et al. | 348/184 |
| 2011/0181692 A1* | 7/2011 | Kuno | 348/43 |
| 2012/0050563 A1 | 3/2012 | Cote et al. | |
| 2012/0054567 A1 | 3/2012 | Valakh et al. | |
| 2012/0136612 A1 | 5/2012 | Vanderhoff et al. | |
| 2012/0287289 A1* | 11/2012 | Steinberg et al. | 348/181 |
| 2013/0021478 A1* | 1/2013 | Hobrock et al. | 348/177 |

OTHER PUBLICATIONS

"Digital Video Analyzer automates HDMI tests", Retrieved at <<http://news.thomasnet.com/fullstory/Digital-Video-Analyzer-automates-HDMI-tests-597348>>, Jun. 13, 2011, pp. 3.

(Continued)

*Primary Examiner* — Victor Kostak
(74) *Attorney, Agent, or Firm* — Aaron Chatterjee; Peter Taylor; Micky Minhas

(57) ABSTRACT

Systems and methods for evaluating video quality of HDMI data are provided. In one example an HDMI video quality evaluator controls a video device to render a test pattern and encode the pattern into HDMI. The video device is controlled to transmit the HDMI formatted pattern from an output port to an input port on the device, capture a frame of the pattern, and transmit the frame to the quality evaluator. The quality evaluator compares rendered pixels in the frame to test pixels in the test pattern to identify video quality errors. Errors that exceed a threshold are identified, and a test result is outputted that includes errors exceeding the threshold.

20 Claims, 6 Drawing Sheets

(56) References Cited

OTHER PUBLICATIONS

"Picture Quality Analysis: Real-Time Measurements for Objective Video Quality", Retrieved at <<http://sine.ni.com/nipdfgenerator/nipdfgenerator?pageURl=http://www.ni.com/white-paper/12703/en&clientAppName=dz&dotsPerPixel=&dotsPerPoint=>>, Jun. 22, 2012, pp. 4.

ISA European Patent Office, International Search Report & Written Opinion of PCT/US2014/023398, Jun. 18, 2014, Netherlands, 13 Pages.

* cited by examiner

GAMING DEVICE 18

HDMI VIDEO QUALITY EVALUATOR 14

RECEIVE CAPTURED FRAME 240

GENERATE FILE INCLUDING VIDEO INFORMATION AND X,Y VALUES FROM CAPTURED FRAME 242

COMPARE RENDERED PIXELS TO TEST PIXELS TO IDENTIFY VIDEO QUALITY ERROR 244

RANDOMLY SAMPLE RENDERED PIXELS OF GENERATED TEST PATTERN 246

EVALUATE VIDEO QUALITY ERRORS TO IDENTIFY ERRORS EXCEEDING THRESHOLD 248

EVALUATE PIXEL CROP 250

EVALUATE COLOR CONVERSION 252

EVALUATE DITHER 254

EVALUATE MONOTONICITY 256

ASPECT RATIO 258

IDENTIFY DIFFERENCE BETWEEN RENDERED AND TEST PIXEL VALUES 260

USE DELTA E FORMULA 262

OUTPUT TEST RESULT 264

GAMING DEVICE 18

HDMI VIDEO QUALITY EVALUATOR 14

REPEAT STEPS 204 TO 264 FOR SECOND COLOR SPACE 266

REPEAT STEPS 204 TO 264 FOR SECOND SCAN TYPE 268

REPEAT 204 TO 264 FOR SECOND BIT DEPTH 270

END

FIG. 2C

HDMI IMAGE QUALITY ANALYSIS

BACKGROUND

Video quality of analog and digital video produced by a source device may be tested in a variety of manners. Historically oscilloscopes such as wave form monitors and vectorscopes have been commonly used to measure aspects of video quality. For uncompressed digital video data transferred via the High Definition Multimedia Interface (HDMI) protocol, an HDMI analyzer may be used to evaluate the bitstream syntax of the digital data.

A source device that produces HDMI content includes an HDMI transmitter that formats and encodes video and audio data according to the HDMI protocol. The transmitter transmits the encoded content from an output port via an HDMI cable to an HDMI sink device, such as a television. Analyzing video quality produced by an HDMI source device may be performed by connecting the HDMI output port to an HDMI analyzer via an HDMI cable.

Connecting a source device to an HDMI analyzer in this manner necessitates that each unit is individually cabled to a separate analyzer for the duration of the analysis. Additionally, each unit is typically configured manually to set the desired output parameters for testing, such as resolution, scan type, etc. In some settings, such as a device manufacturing line or quality control station, performing such an analysis in this manner adds labor and dwell time at the analysis station, as well as line configuration limitations imposed by cabling requirements. Manufacturing line complexity is thereby increased and production volumes may be negatively impacted.

SUMMARY

To address the above issues, systems and methods for evaluating video quality of data transmitted by a video device via HDMI are provided. In one example the method may include, at an HDMI video quality evaluator, controlling the video device to render a test pattern and encode the rendered test pattern into an HDMI format. The video device is then controlled to transmit the HDMI formatted test pattern from an output port to an input port on the video device, capture a frame of the test pattern, and transmit the frame to the HDMI video quality evaluator.

The method further includes receiving the frame at the HDMI video quality evaluator from the video device and comparing rendered pixels in the frame to test pixels in the test pattern to identify one or more video quality errors in the frame. The one or more video quality errors are evaluated to identify any errors that exceed a threshold, and a test result is outputted that includes one or more of the video quality errors that exceed the threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A, 2B and 2C are a flow chart of a method for evaluating video quality of data transmitted by a video device via HDMI according to an embodiment of the present disclosure.

DETAILED DESCRIPTION

Figure 1:
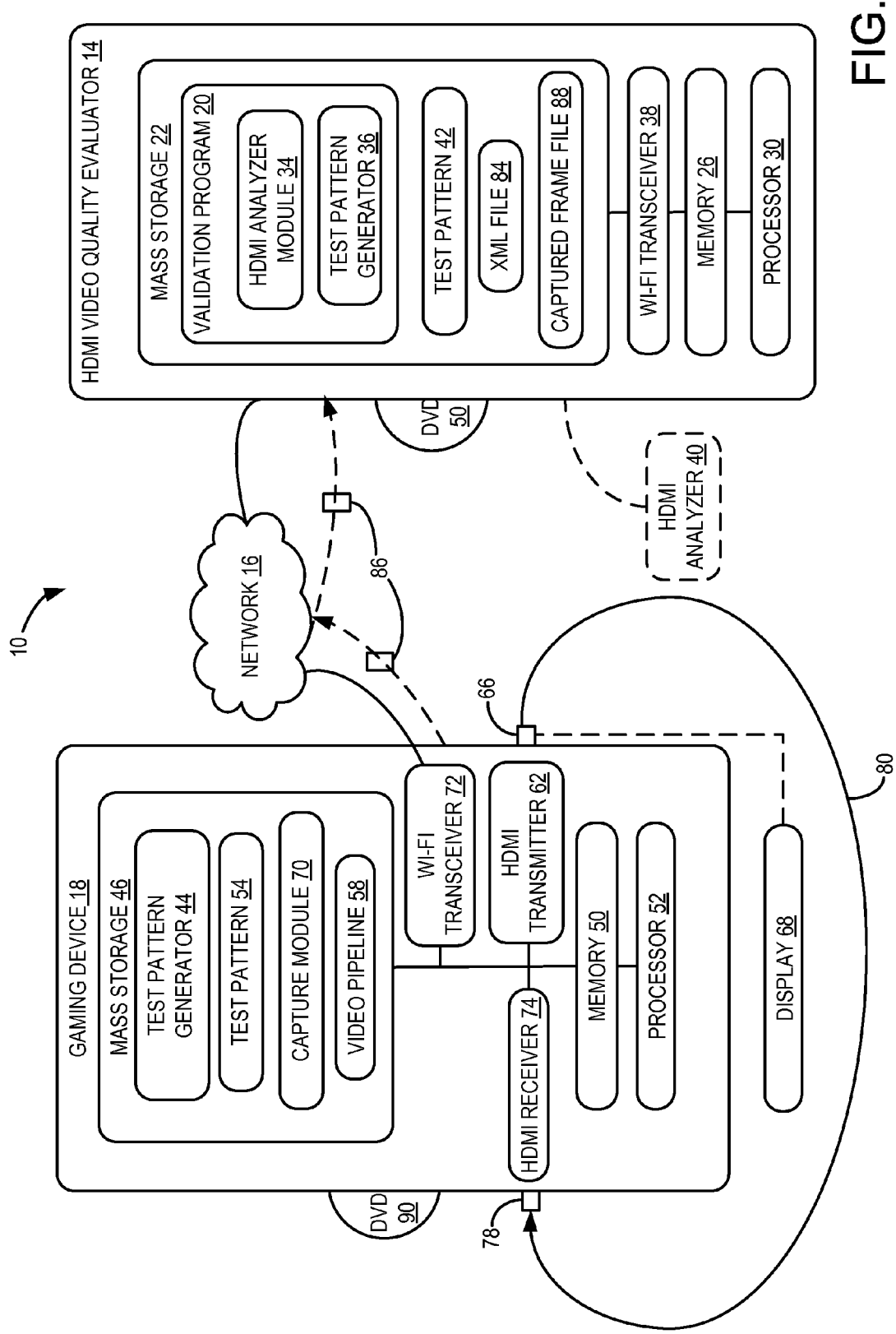
FIG. 1 is a schematic view of an HDMI video quality evaluating system according to an embodiment of the present disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales and numbers of components shown in the figures may be purposely distorted to make certain features or relationships easier to see.

FIG. 1 is a schematic view of one embodiment of an HDMI video quality evaluating system 10 for evaluating video quality of data transmitted by a video device via HDMI. The HDMI video quality evaluating system 10 may include an HDMI video quality evaluator 14 that may be communicatively coupled to a network 16. The HDMI video quality evaluator 14 may take the form of a network computing device, desktop computing device, mobile computing device such as a smart phone, laptop, notebook or tablet computer, or other suitable type of computing device. The HDMI video quality evaluator 14 may include or be coupled with a display to present a visual representation of data held by a storage subsystem. Additional details regarding the components and computing aspects of the HDMI video quality evaluator 14 are described in more detail below with reference to FIG. 4.

The network 16 may take the form of a local area network (LAN), wide area network (WAN), wired network, wireless network, personal area network, or a combination thereof, and may include the Internet. As described in more detail below, in some examples the HDMI video quality evaluator 14 may be communicatively coupled via network 16 to one or more computing devices, such as gaming device 18. Such devices may be located in a manufacturing facility and/or quality control setting in which the devices are manufactured and/or tested. In other examples such devices may be located in the field, such as when the gaming device 18 is located in a user's home. It will also be appreciated that HDMI video quality evaluator 14 may communicate with a plurality of computing devices via network 16.

The HDMI video quality evaluator 14 may comprise a validation program 20 that comprises instructions stored in mass storage 22 of the HDMI video quality evaluator 14. The validation program 20 may be loaded into memory 26 and executed by a processor 30 of the HDMI video quality evaluator 14 to perform one or more of the methods and processes described in more detail below. The HDMI video quality evaluator 14 may also include an HDMI analyzer module 34 that is configured to measure HDMI data streams and record various characteristics and aspects of such streams including, but not limited to, HDMI protocol compliance, timing analysis, pixel color values, pixel errors, content protection status, etc. It will be appreciated that in other examples, the HDMI video quality evaluator 14 may be connected to a separate HDMI analyzer 40.

The HDMI video quality evaluator 14 may further include a test pattern generator 36 configured to generate test patterns, such as test pattern 42, in various formats for evaluating and testing HDMI content as described below. The HDMI video quality evaluator 14 may also include a Wi-Fi transceiver 38 for wirelessly connecting the evaluator to one or more other computing devices, such as gaming device 18, via network 16. It will be appreciated that in other examples the HDMI video quality evaluator 14 may use any other suitable networking or connectivity protocols or techniques to communicatively engage with other computing devices.

Gaming device 18 may also comprise a test pattern generator 44 that includes instructions stored in mass storage 46 of the gaming device. The test pattern generator 44 may be loaded into memory 50 and executed by a processor 52 of the gaming device 18 to generate test patterns, such as test pattern 54. Gaming device 18 also comprises a video rendering pipeline that includes video pipeline software 58 stored in mass storage 46, and video pipeline hardware including an HDMI transmitter 62 communicatively coupled to an HDMI output port 66. It will be appreciated that gaming device 18 may be communicatively coupled to a display device 68 via the HDMI output port 66 to enable a user to play various games and view video content. The gaming device 18 may also include a capture module 70 that is configured to capture one or more HDMI frames generated by the video rendering pipeline. Any suitable video capture device or component that captures HDMI video content may be utilized.

The gaming device 18 may also include a Wi-Fi transceiver 72 for connecting the gaming device to the HDMI video quality evaluator 14 and/or other computing devices via network 16. It will be appreciated that in other examples the gaming device 18 may use any other suitable networking or connectivity protocols or techniques to communicatively engage with other computing devices. Further, gaming device 18 includes an HDMI receiver 74 communicatively coupled to an HDMI input port 78. As described in more detail below, in some examples the HDMI receiver 74 may receive HDMI-formatted test patterns rendered by the gaming device 18 and transferred via an HDMI cable 80 connected to the HDMI output port 66.

Figure 2A:
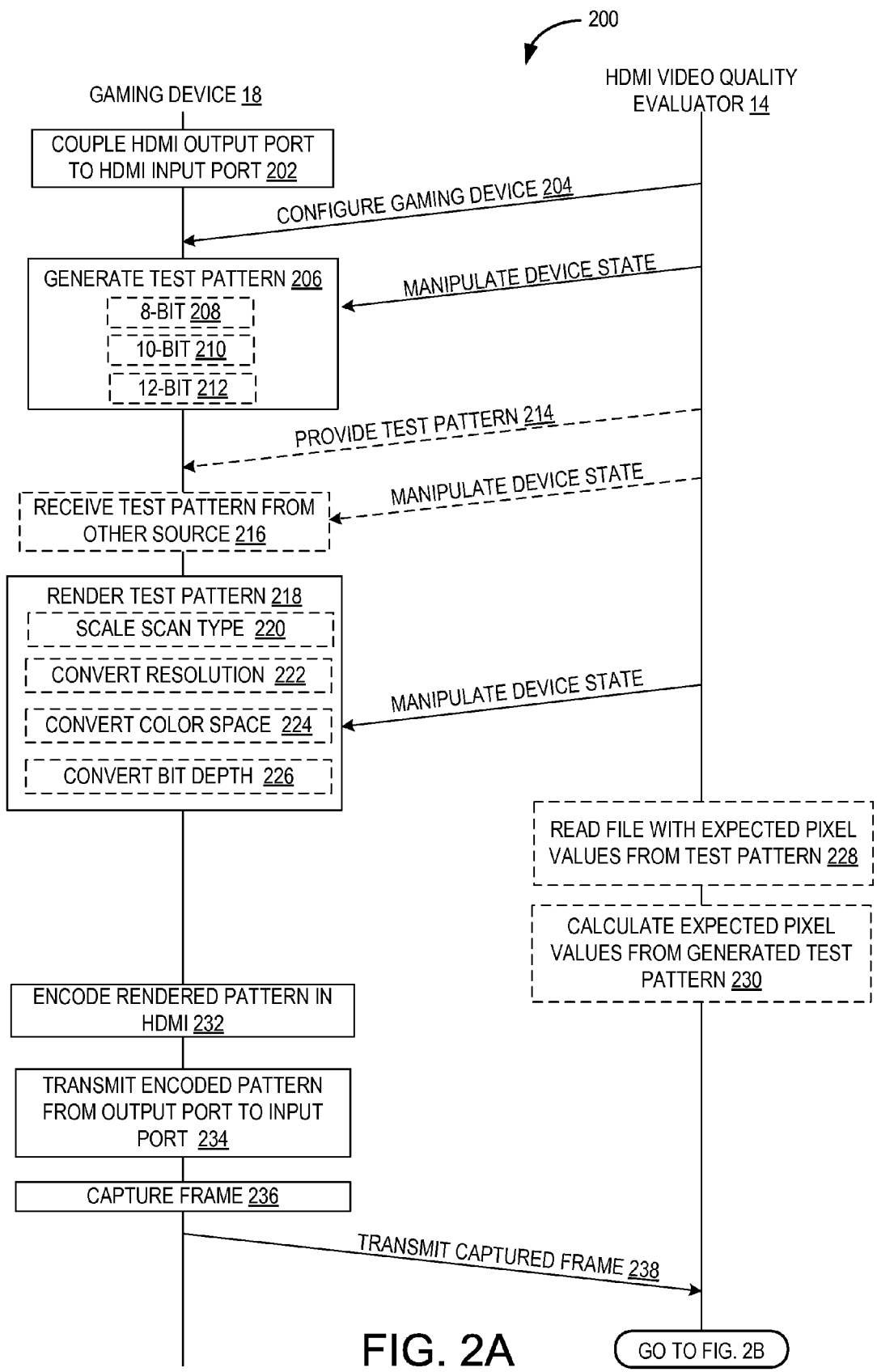

With reference also to FIGS. 2A, 2B and 2C, example use cases of the HDMI video quality evaluating system 10 and associated components, such as the HDMI video quality evaluator 14 and gaming device 18, will now be described. FIGS. 2A, 2B and 2C illustrate a flow chart of a method 200 for evaluating video quality of data transmitted by a video device using HDMI according to an embodiment of the present disclosure. The following description of method 200 is provided with reference to the software and hardware components of the HDMI video quality evaluator 14 and gaming device 18 described above and shown in FIG. 1. It will be appreciated that method 200 may also be performed in other contexts using other suitable hardware and software components.

In one example, the HDMI video quality evaluator 14 may be located in a manufacturing facility that produces gaming devices, such as gaming device 18. The gaming device 18 may be configured to generate and transmit video via the video rendering pipeline including the video pipeline software 58 and HDMI transmitter 62. To ensure proper operation of the gaming device 18, it may be desirable to evaluate the quality of video generated and transmitted via HDMI by the gaming device 18.

Accordingly, and with reference to FIG. 2A, in one example at 202 the method 200 includes coupling the HDMI output port 66 to the HDMI input port 78 with an HDMI cable 80. At 204 the method 200 includes using the HDMI video quality evaluator 14 to control the gaming device 18 to perform a plurality of actions that manipulate the state of the gaming device and invoke various configurations related to generating and transmitting HDMI encoded video. At 206, the gaming device 18 is controlled to generate a test pattern that may be utilized to evaluate various aspects of video quality. For example, the test pattern generator 44 may be controlled to generate one or more desired test patterns, such as test pattern 54.

In one example, the HDMI video quality evaluator 14 may manipulate the gaming device 18 to generate test patterns having different desired bit depths. For example, at 208 the method 200 may include controlling the gaming device 18 to generate a test pattern having 8-bit color. It will be appreciated that in a 3 component color space such as RGB, YCbCr, HSL, etc., an 8-bit test pattern comprises 24 bits per pixel. In another example, at 210 the method 200 may include controlling the gaming device 18 to generate the same test pattern, or a different test pattern, having 10-bit color. It will be appreciated that in a 3 component color space a 10-bit test pattern comprises 30 bits per pixel. In another example, at 212 the method 200 may include controlling the gaming device 18 to generate the same test pattern, or a different test pattern, having 12-bit color. It will be appreciated that in a 3 component color space a 12-bit test pattern comprises 36 bits per pixel.

It will also be appreciated that test patterns having other bit depths may also be generated. Additionally, and as explained in more detail below, in these examples the test patterns are generated natively by the gaming device 18 at the direction of the HDMI video quality evaluator 14. Accordingly, for such test patterns and/or other test patterns generated by the HDMI video quality evaluator 14, the HDMI video quality evaluator may store one or more files that comprise various file and image attributes of the test patterns. Such attributes may include, but are not limited to, pixel locations such as x and y coordinates in the test pattern, native color space values (such as YCbCr), expected converted color space values (such as RGB), and content protection status (such as High-bandwidth Digital Content Protection (HDCP)). For example, an XML file 84 may comprise pixel locations, values, and other qualities of the test pattern 54 generated by the gaming device 18.

Further, because the test pattern 54 is natively generated by the gaming device 18 and not previously routed through a video rendering pipeline, the imaging attributes of the test pattern as delivered to the video rendering pipeline may correspond exactly to the imaging attributes in the corresponding XML file 84. As described in more detail below, the HDMI video quality evaluator 14 may receive a captured frame 86 of the rendered test pattern after it has passed through the video rendering pipeline of the gaming device 18. Advantageously, in this manner rendered pixels from a captured frame of the rendered test pattern may be compared to test pixels in the test pattern from the XML file 84 to identify one or more video quality errors in the frame.

In another example, at 214 the HDMI video quality evaluator 14 may provide a test pattern, such as test pattern 42, to the gaming device 18. In still another example, at 216 the gaming device 18 may receive a test pattern from one or more other sources. Such other sources may include, but are not limited to, a DVD 90, Blu-ray disc, and streaming digital content accessible via network 16.

At 218 the HDMI video quality evaluator 14 may control the gaming device 18 to render the test pattern via the video pipeline software 58 and the HDMI transmitter 62. In the rendering process various different formats and configurations of the test pattern may be generated and eventually evaluated by the HDMI video quality evaluator 14 as described in more detail below. For example, at 220 a scaler in the video rendering pipeline may scale a test pattern 54 from a first scan type, such as progressive scan, to a second scan type, such as interlaced scan. In other examples, at 222 the scaler may upconvert a test pattern from a first resolution, such as 720 lines, to a second resolution, such as 1080 lines. In still other examples, the scaler may scale a test pattern from a standard definition image to a high definition image.

In another example, at 224 the video rendering pipeline may convert the color space of test pattern 54 from a first color space, such as YCbCr, to a second color space, such as RGB. In another example, at 226 the video rendering pipeline may convert the bit depth of test pattern 54 from a first bit depth, such as 8-bit, to a second bit depth, such as 10-bit.

In an example where a test pattern has been generated, identified, or otherwise selected by the HDMI video quality evaluator 14, at 228 the method 200 may include reading a corresponding XML file that comprises various expected pixel values, locations, and other file and image attributes of the test pattern as discussed above. In another example where the test pattern is generated by the test pattern generator 44 of the gaming device 18, at 230 the method 200 may include calculating expected pixel values at various x,y coordinates in the generated test pattern. For example, and with reference to the test pattern 300 shown in FIG. 3 and discussed in more detail below, the expected values of at least one of the rendered pixels of a frame of the test pattern may be calculated. Advantageously, calculating such values may enable the validation program 20 to randomly sample the rendered test pattern.

It will be appreciated that employing random or semi-random sampling of pixels in a test pattern may enhance the ability of the HDMI video quality evaluator 14 to consistently identify errors in video output. In some examples, if the same pixels or points are sampled with every test pattern and device tested, then a particular combination of device and pattern may result in one or more errors going undetected. Random or semi-random sampling increases the probability of identifying such errors.

In one example, a semi-random sampling approach may employ a component of random pixel sampling and a component of fixed pixel sampling that ensures one or more particular errors or features are always examined. For example, one approach may include a fixed component that captures an edge pixel from each edge of the test pattern to verify that cropping has not occurred. The approach may also randomly select the location in the column or row of that edge for the selected pixel. Such a semi-random approach may also ensure that particular errors or features are examined, while also potentially reducing the total number of samples required as compared to a densely populated, evenly distributed random pattern.

At 232 the method 200 may include controlling the gaming device 18 to encode the rendered test pattern into an HDMI format via the HDMI transmitter 62. At 234 the method 200 may include controlling the gaming device 18 to transmit the HDMI formatted test pattern from the output port 66 to the input port 78 via the HDMI cable 80. The HDMI receiver 74 in the gaming device 18 may receive the HDMI formatted test pattern.

At 236 the method 200 includes controlling the gaming device 18 to capture one or more frames 86 of the HDMI formatted test pattern using, for example, the capture module 70. At 238 the method 200 includes controlling the gaming device 18 to transmit the captured frame 86 to the HDMI video quality evaluator 14 via the network 16.

With reference now to FIG. 2B, at 240 the method 200 includes receiving the captured frame 86 at the HDMI video quality evaluator 14. In one example, at 242 the method 200 includes generating a captured frame file 88 that includes video information and values of rendered pixels at x,y locations in the captured frame 86. The captured frame file 88 may take the form of a CSV file, an .xls file, or any other suitable file format.

At 244 the method 200 includes comparing the values of rendered pixels in the captured frame 86 to values of corresponding test pixels in the test pattern to identify one or more video quality errors in the frame. Values of the test pixels in the test pattern may be accessed, for example, from the XML file 84 that corresponds to the test pattern 54. In one example where the test pattern is generated by the gaming device 18, at 246 the method 200 includes randomly sampling rendered pixels of the generated test pattern.

Figure 3:
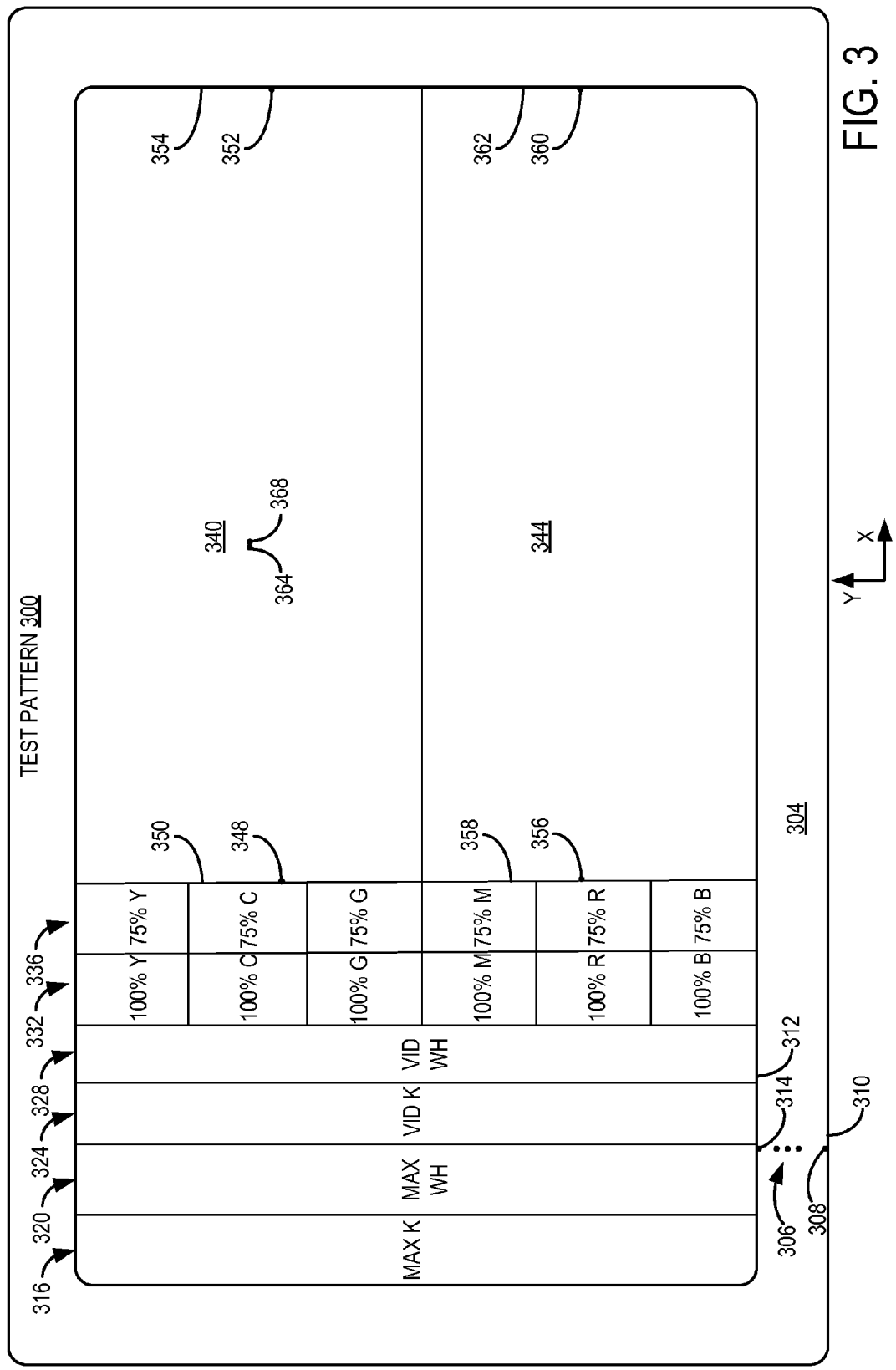
FIG. 3 is a schematic illustration of an embodiment of a test pattern.

With reference now to FIG. 3, an example test pattern 300 is illustrated. As described above, captured frames 86 of test pattern 300 may be utilized by the HDMI video quality evaluator 14 to identify one or more video quality errors. In this example, the test pattern 300 includes a 40 pixel-wide border, indicated at 304, that circumscribes the pattern. At 306 representative test pixels (not to scale) of the 40 pixel-wide border are illustrated. In one example, a pixel 308 at an outer edge 310 of the border 304 may have a value of 100. Moving in the y-direction across the border 304 the value of each adjacent pixel may linearly increase by one to the inner edge 312 of the border, with the pixel 314 at the inner edge having a value of 140.

Areas 316, 320, 324 and 328 may each comprise a 20 pixels-wide by 520 pixels-high portion of the test pattern 300. In one example, area 316 may be solely comprised of pixel values representing a maximum black color. Area 320 may be solely comprised of pixel values representing a maximum white color. Area 324 may be solely comprised of pixel values representing a video black color. And area 328 may be solely comprised of pixel values representing a video white color.

The 6 vertically arranged color blocks indicated at 332 include, from top to bottom, pixel values representing 100% yellow, 100% cyan, 100% green, 100% magenta, 100% red, and 100% blue colors. The adjacent 6 vertically arranged color blocks indicated at 336 include, from top to bottom, pixel values representing 75% yellow, 75% cyan, 75% green, 75% magenta, 75% red, and 75% blue colors. It will be appreciated that the pixel values and corresponding color percentages relate to a video content range, such as an 8-bit, 16-235 range. In this example, 100% corresponds to a value of 235.

Areas 340 and 344 provide a color gradient from a maximum black color value to a maximum white color value. With the maximum black color represented by test pixels along the left edge 350 of area 340, such as test pixel 348, the gradient increases one value per pixel in the x-direction to pixels having a midpoint value along the right edge 354, such as test pixel 352. Beginning at pixels along the left edge 358 of area 344, such as test pixel 356, the gradient continues increasing one value per pixel in the x-direction from the midpoint value at test pixel 356 to a maximum white color at pixels along the right edge 362, such as test pixel 360. For example with the gradient increasing one value per pixel in the x-direction, representative test pixel 364 has a value one less than adjacent test pixel 368 (not to scale).

It will be appreciated that the number and arrangement of blocks and areas, dimensions, pixel values, colors and other properties of test pattern 300 are one example, and other test patterns having different blocks and areas, dimensions, pixel values, colors and/or other properties may also be used and are within the scope of the present disclosure. For example, with a 36 bit per pixel color depth and a 720p resolution, four areas that provide a color gradient or ramp from a maximum black color value to a maximum white color value may be utilized. Advantageously, by enabling the use of test patterns having various properties, the present disclosure enables a complete ramp for all color depths to be produced, even for pattern widths that are significantly smaller than the number of values in the ramp.

With reference again to FIG. 2B, at 248 the method 200 includes evaluating the one or more identified video quality errors to identify any errors that exceed a threshold. At 250 the method 200 may include evaluating a pixel crop error. For example, the test pattern border 304 in the captured frame 86 may be examined to determine if it is uniformly 40 pixels wide around the test pattern. If the border 304 deviates from 40 pixels wide at any point, such deviation may be recorded. At 252 the method 200 may include evaluating a color conversion or color accuracy error. For example, each of the 12 color blocks indicated at 332 and 336 in the test pattern 300 may be evaluated for any color accuracy errors.

At 254 the method 200 may include evaluating a dither error. For example, the presence of dither in the gradient areas 340 and 344 may be evaluated. At 256 the method 200 may include evaluating a monotonicity error. In one example, evaluating a monotonicity of the test pattern 300 may include examining areas 340 and 344 to determine whether adjacent pixel values in the x-direction are increasing in a continuous, monotonic manner. At 258 the method 200 may include evaluating an aspect ratio error. For example, where the captured frame 86 has been converted from a 16:9 aspect ratio to a 4:3 aspect ratio, the size and location of the windowboxing vertical and horizontal bars bordering the frame may be evaluated.

To evaluate whether one or more identified video quality errors exceeds a threshold, in one example at 260 the method 200 includes identifying a difference between a rendered pixel value of one of the rendered pixels and a test pixel value of one of the test pixels. For example, where the test pattern 300 is natively generated by the test pattern generator 36 of the HDMI video quality evaluator 14, and then provided to the gaming device 18, the absolute positions and values of each pixel in the pattern are known. Using this natively generated test pattern, the validation program 20 may calculate the expected positions and values of each pixel in the HDMI frame 86 captured from the test pattern that is rendered by the gaming device 18. The validation program 20 may then compare each pixel value at each position in the captured frame 86 to the expected value at that position to identify any deviation. In one example of a manufacturing environment, this process advantageously enables identification of any video quality error present in a captured frame.

In another example, identifying errors that exceed a threshold may comprise identifying errors that exceed a visually noticeable threshold. For example, at 262 the method 200 may include applying a color difference metric to the one or more video quality errors. Where the video quality error is a color accuracy error, in one example a Delta-E formula, such as dE94, may be applied to determine whether the color accuracy error may be visually noticeable to a user.

In another example, the XML file 84 may identify the method or methods to be used for evaluating the relevant threshold. For example, the XML file could define the failure threshold for pixels within each of the areas 340, 344 of test pattern 300, comprising the color gradient or ramp, to be horizontally monotonic, in addition to a simple +/−threshold. For the color blocks indicated at 332 and 336, however, the XML file could apply dE94.

In another example, a range of pixels from which to select a random sample of size n may be defined. For each sample n, each pixel may be evaluated based not only on the calculated value but on other specified criteria as well. Such specified criteria may vary based on the characteristics that range of pixels may be known to have. In the case of a ramp, if the sampled pixel value is correct, but the pixels on either side of the sampled pixel are not offset by one, then an error with respect to the ramp threshold would be indicated even though the sampled pixel value is correct.

At 264 the method 200 includes outputting a test result that includes any of the one or more video quality errors that exceed the threshold. In one example, the validation program 20 may generate a test result that comprises visual representations of the one or more quality errors that may be rendered on a display (not shown) associated with the HDMI video quality evaluator 14. In another example, the validation program 20 may generate a test result that comprises a document that includes one or more quantifications, evaluations, or other descriptions of the one or more quality errors. It will be appreciated that the test result may comprise other forms, media types, file types and combinations of the foregoing.

With reference now to FIG. 2C, in one example the test pattern utilized in method 200 may comprise a first color space, such as YCbCr. In this example, at 266 the method 200 may include repeating all or selected steps 204-264 for the same test pattern rendered in a second, different color space, such as RGB. In another example the test pattern utilized in method 200 may have a first resolution, such as 720 lines. In this example, at 268 the method 200 may include repeating all or selected steps 204-264 for the same test pattern rendered in a second, different resolution, such as 1080. In still another example, the test pattern utilized in method 200 may have a first bit depth, such as 8-bits per pixel. In this example, at 270 the method 200 may include repeating all or selected steps 204-264 for the same test pattern rendered in a second, different bit depth, such as a 10-bits per pixel.

It will be appreciated that method 200 is provided by way of example and is not meant to be limiting. Therefore, it is to be understood that method 200 may include additional and/or alternative steps than those illustrated in FIGS. 2A, 2B and 2C. Further, it is to be understood that method 200 may be performed in any suitable order. Further still, it is to be understood that one or more steps may be omitted from method 200 without departing from the scope of this disclosure.

Accordingly and as described above, the present disclosure presents embodiments of an HDMI video quality evaluating system 10 and related method 200 that control a computing device to send HDMI formatted test patterns from an output port to an input port of the device, capture frames of the pattern and wirelessly transmit the captured frames to an HDMI video quality evaluator. In this manner, the HDMI video quality system 10 and method 200 provides a simple, minimally labor intensive process for testing video quality of HDMI content generated on a computing device.

Additionally, by configuring the computing device to include both an HDMI output port and HDMI input port, and by utilizing a wireless network, the present system and method enable HDMI video quality testing while imposing minimal constraints on the location of the HDMI video quality evaluator and devices under test. The present system and method also enable simple validation of one or more additional components that may be added to the video rendering pipeline of a device that has been previously evaluated. For example, once a video device has been evaluated for video quality errors, additional components may be added to the video rendering pipeline, and the pipeline may be easily validated using the same methods and/or test patterns. For example, a new video quality transform may be added to the pipeline of a device that has been validated by the present method, and the modified device/pipeline may be conveniently evaluated using the same method without changing the methodology or system setup.

Figure 4:
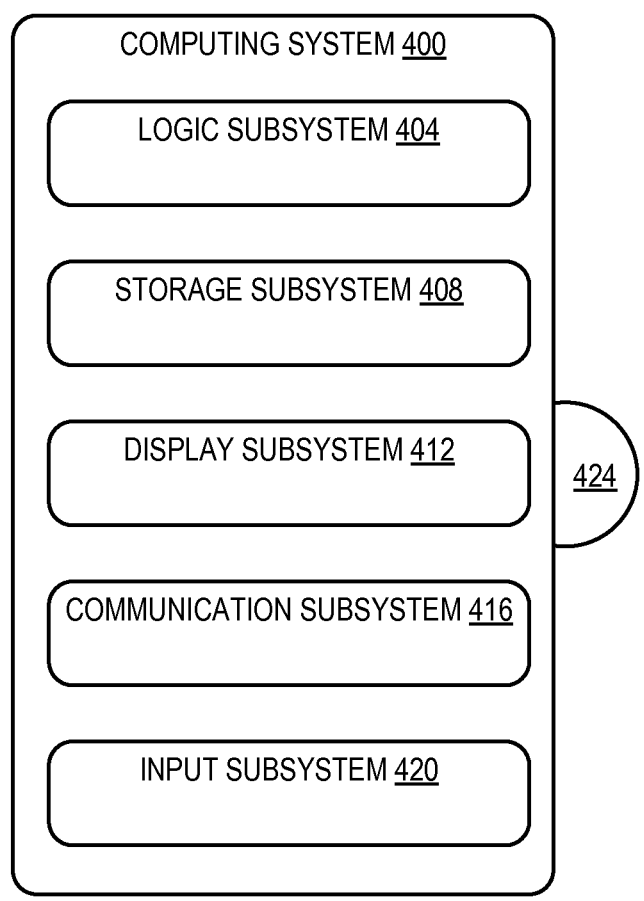
FIG. 4 is a simplified schematic illustration of an embodiment of a computing device.

FIG. 4 schematically shows a nonlimiting embodiment of a computing system 400 that may perform one or more of the above described methods and processes. HDMI video quality evaluator 14 and gaming device 18 described above may take the form of computing system 400. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

As shown in FIG. 4, computing system 400 includes a logic subsystem 404 and a storage subsystem 408. Computing system 400 may optionally include a display subsystem 412, a communication subsystem 416, an input subsystem 420 and/or other subsystems and components not shown in FIG. 4. Computing system 400 may also include computer readable media, with the computer readable media including computer readable storage media and computer readable communication media. Computing system 400 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 404 may include one or more physical devices configured to execute one or more instructions. For example, the logic subsystem 404 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 404 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 408 may include one or more physical, persistent devices configured to hold data and/or instructions executable by the logic subsystem 404 to implement the herein described methods and processes. When such methods and processes are implemented, the state of storage subsystem 408 may be transformed (e.g., to hold different data).

Storage subsystem 408 may include removable media and/or built-in devices. Storage subsystem 408 may include optical memory devices (e.g., CD, DVD, HD DVD, Blu-ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 408 may include devices with one or more of the following characteristics: volatile, nonvolatile, dynamic, static, read/write, read-only, random access, sequential access, location addressable, file addressable, and content addressable.

In some embodiments, aspects of logic subsystem 404 and storage subsystem 408 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 4 also shows an aspect of the storage subsystem 408 in the form of removable computer readable storage media 424, which may be used to store data and/or instructions executable to implement the methods and processes described herein. Removable computer-readable storage media 424 may take the form of CDs, DVDs, HD DVDs, Blu-Ray Discs, EEPROMs, and/or floppy disks, among others.

It is to be appreciated that storage subsystem 408 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 412 may be used to present a visual representation of data held by storage subsystem 408. As the above described methods and processes change the data held by the storage subsystem 408, and thus transform the state of the storage subsystem, the state of the display subsystem 412 may likewise be transformed to visually represent changes in the underlying data. The display subsystem 412 may include one or more display devices, such as display 68 described above, utilizing virtually any type of technology. Such display devices may be combined with logic subsystem 404 and/or storage subsystem 408 in a shared enclosure, or such display devices may be peripheral display devices.

When included, communication subsystem 416 may be configured to communicatively couple computing system 400 with one or more networks and/or one or more other computing devices. Communication subsystem 416 may include wired and/or wireless communication devices compatible with one or more different communication protocols. As nonlimiting examples, the communication subsystem 416 may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

When included, input subsystem 420 may comprise or interface with one or more sensors or user-input devices such as a game controller, gesture input detection device, voice recognizer, inertial measurement unit, keyboard, mouse, or touch screen. In some embodiments, the input subsystem 420 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The terms "module" and "program" may be used to describe an aspect of the HDMI video quality evaluator 14 that is implemented to perform one or more particular functions. In some cases, such a module or program may be instantiated via logic subsystem 404 executing instructions held by storage subsystem 408. It is to be understood that different modules and programs may be instantiated from the same application, service, code block, object, library, routine, API, function, etc. Likewise, the same module or program may be instantiated by different applications, services, code blocks, objects, routines, APIs, functions, etc. The terms "module" and "program" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At an HDMI video quality evaluator, a method for evaluating video quality of data transmitted by a video device via HDMI, comprising steps of:
  (a) controlling the video device to:
    render a test pattern;
    encode the rendered test pattern into an HDMI format;
    transmit the HDMI formatted test pattern from an output port on the video device to an input port on the video device;
    capture a frame of the test pattern; and
    transmit the frame to the HDMI video quality evaluator;
  (b) receiving the frame from the video device;
  (c) comparing rendered pixels in the frame to test pixels in the test pattern to identify one or more video quality errors in the frame;
  (d) evaluating the one or more video quality errors to identify any errors that exceed a threshold; and
  (e) outputting a test result that includes one or more of the video quality errors that exceed the threshold.

2. The method of claim 1, wherein the threshold comprises a visually noticeable threshold, and evaluating the one or more video quality errors comprises applying a color difference metric to the one or more video quality errors.

3. The method of claim 1, wherein the one or more video quality errors include a difference between a rendered pixel value of one of the rendered pixels and a test pixel value of one of the test pixels.

4. The method of claim 1, wherein the test pattern is a first test pattern in a first color space, and further comprising performing each of the steps (a)-(e) for at least a second test pattern in a second color space that is different from the first color space.

5. The method of claim 1, wherein the test pattern is a first test pattern having a first scan type, and further comprising performing each of the steps (a)-(e) for at least a second test pattern having a second scan type that is different from the first scan type.

6. The method of claim 1, wherein the test pattern is a first test pattern having a first bit depth, and further comprising performing each of the steps (a)-(e) for at least a second test pattern having a second bit depth that is different from the first bit depth.

7. The method of claim 1, wherein the one or more video quality errors are selected from the group consisting of a color accuracy error, a pixel crop error, a dither error, a monotonicity error, and an aspect ratio error.

8. The method of claim 1, further comprising:
  controlling the video device to generate the test pattern; and
  calculating an expected value of at least one of the rendered pixels in the frame located at an x coordinate and a y coordinate in the frame.

9. The method of claim 1, further comprising controlling the video device to receive the test pattern from a source.

10. An HDMI video quality evaluator for evaluating video quality of data transmitted by a video device via HDMI, the HDMI video quality evaluator comprising:
  a validation program comprising instructions stored in a mass storage of the HDMI video quality evaluator, the validation program configured to:
  (a) control the video device to:
  render a test pattern;
  encode the rendered test pattern into an HDMI format;
  transmit the HDMI formatted test pattern from an output port on the video device to an input port on the video device;
  capture a frame of the test pattern; and
  transmit the frame to the HDMI video quality evaluator;
  (b) receive the frame from the video device;
  (c) control an HDMI analyzer to compare rendered pixels in the frame to test pixels in the test pattern to identify one or more video quality errors in the frame;
  (d) evaluate the one or more video quality errors to identify any errors that exceed a threshold; and
  (e) output a test result that includes one or more of the video quality errors that exceed the threshold.

11. The HDMI video quality evaluator of claim 10, wherein the threshold comprises a visually noticeable threshold, and evaluating the one or more video quality errors comprises applying a color difference metric to the one or more video quality errors.

12. The HDMI video quality evaluator of claim 10, wherein the one or more video quality errors include a difference between a rendered pixel value of one of the rendered pixels and a test pixel value of one of the test pixels.

13. The HDMI video quality evaluator of claim 10, wherein the test pattern is a first test pattern in a first color space, and the validation program is further configured to perform each of (a)-(e) for at least a second test pattern in a second color space that is different from the first color space.

14. The HDMI video quality evaluator of claim 10, wherein the test pattern is a first test pattern having a first scan type, and the validation program is further configured to perform each of (a)-(e) for at least a second test pattern having a second scan type that is different from the first scan type.

15. The HDMI video quality evaluator of claim 10, wherein the test pattern is a first test pattern having a first bit depth, and the validation program is further configured to perform each of (a)-(e) for at least a second test pattern having a second bit depth that is different from the first bit depth.

16. The HDMI video quality evaluator of claim 10, wherein the one or more video quality errors are selected from the group consisting of a color accuracy error, a pixel crop error, a dither error, a monotonicity error, and an aspect ratio error.

17. The HDMI video quality evaluator of claim 10, wherein the validation program is further configured to:
control the video device to generate the test pattern; and
calculate an expected value of at least one of the rendered pixels in the frame located at an x coordinate and a y coordinate in the frame.

18. The HDMI video quality evaluator of claim 10, wherein the validation program is further configured to control the video device to receive the test pattern from a source.

19. At an HDMI video quality evaluator, a method for evaluating video quality of data transmitted by a video device via HDMI, comprising steps of:
(a) controlling the video device to:
render a test pattern;
encode the rendered test pattern into an HDMI format;
transmit the HDMI formatted test pattern from an output port to an input port on the video device;
capture a frame of the test pattern; and
transmit the frame to the HDMI video quality evaluator;
(b) receiving the frame from the video device;
(c) comparing rendered pixels in the frame to test pixels in the test pattern to identify one or more video quality errors in the frame;
(d) evaluating the one or more video quality errors to identify any errors that exceed a threshold;
(e) outputting a test result that includes one or more of the video quality errors that exceed the threshold; and
(f) wherein the test pattern is a first test pattern in a first color space having a first scan type and a first bit depth, performing each of the steps (a)-(e) for at least a second test pattern having one or more of a second color space different from the first color space, a second scan type different from the first scan type, and a second bit depth different from the first bit depth.

20. The method of claim 19, further comprising:
controlling the video device to generate the test pattern; and
calculating an expected value of at least one of the rendered pixels in the frame located at an x coordinate and a y coordinate in the frame.

* * * * *